(12) United States Patent
Williams et al.

(10) Patent No.: US 11,501,486 B2
(45) Date of Patent: Nov. 15, 2022

(54) SURFACE CHARACTERISATION APPARATUS AND SYSTEM

(71) Applicant: Sony Interactive Entertainment Inc., Tokyo (JP)

(72) Inventors: Nigel John Williams, London (GB); Fabio Cappello, London (GB); Timothy Edward Bradley, London (GB); Rajeev Gupta, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 56 days.

(21) Appl. No.: 16/939,393

(22) Filed: Jul. 27, 2020

(65) Prior Publication Data

US 2021/0035354 A1 Feb. 4, 2021

(30) Foreign Application Priority Data

Aug. 1, 2019 (GB) ...................................... 1910989

(51) Int. Cl.
| | | |
|---|---|---|
| *G06T 15/20* | (2011.01) | |
| *G06T 7/529* | (2017.01) | |
| *G01B 11/30* | (2006.01) | |
| *G01N 21/55* | (2014.01) | |
| *G06T 15/50* | (2011.01) | |
| *G06V 10/50* | (2022.01) | |
| *G06V 10/60* | (2022.01) | |
| *G06V 20/20* | (2022.01) | |

(52) U.S. Cl.
CPC .......... *G06T 15/205* (2013.01); *G01B 11/303* (2013.01); *G01N 21/55* (2013.01); *G06T 7/529* (2017.01); *G06T 15/50* (2013.01); *G06V 10/50* (2022.01); *G06V 10/60* (2022.01); *G06V 20/20* (2022.01)

(58) Field of Classification Search
None
See application file for complete search history.

(56) References Cited

U.S. PATENT DOCUMENTS

| | | | | |
|---|---|---|---|---|
| 8,451,323 B1 * | 5/2013 | Poursohi | ................... | G06T 7/70 348/46 |
| 8,629,882 B2 * | 1/2014 | Henry | ...................... | G01J 3/46 345/593 |

(Continued)

FOREIGN PATENT DOCUMENTS

| | | |
|---|---|---|
| EP | 1959392 A1 | 8/2008 |
| WO | 2016134295 A1 | 8/2016 |

OTHER PUBLICATIONS

Combined Search and Examination Report for corresponding GB Application No. GB1910989.1, 6 pages, dated Jan. 15, 2020.

(Continued)

*Primary Examiner* — Edward Martello
(74) *Attorney, Agent, or Firm* — Matthew B. Dernier, Esq.

(57) ABSTRACT

A system for characterising surfaces in a real-world scene, the system comprising an object identification unit operable to identify one or more objects within one or more captured images of the real-world scene, a characteristic identification unit operable to identify one or more characteristics of one or more surfaces of the identified objects, and an information generation unit operable to generate information linking an object and one or more surface characteristics associated with that object.

12 Claims, 9 Drawing Sheets

(56) References Cited

U.S. PATENT DOCUMENTS

| | | | | |
|---|---|---|---|---|
| 8,773,433 | B1* | 7/2014 | Smyrl | G06T 15/506 345/426 |
| 9,947,132 | B2* | 4/2018 | Kettner | G06T 15/04 |
| 2002/0080136 | A1* | 6/2002 | Kouadio | G06T 15/04 345/426 |
| 2004/0150643 | A1* | 8/2004 | Borshukov | H04N 5/262 345/426 |
| 2005/0068537 | A1* | 3/2005 | Han | G01N 21/4795 356/446 |
| 2008/0158239 | A1* | 7/2008 | Lamy | G06T 15/04 345/581 |
| 2016/0253842 | A1* | 9/2016 | Shapira | G06F 3/017 345/633 |
| 2018/0239418 | A1* | 8/2018 | Levesque | G06T 19/006 |
| 2018/0350147 | A1* | 12/2018 | Lodato | H04N 13/282 |
| 2019/0005711 | A1 | 1/2019 | Marin | |
| 2019/0035165 | A1* | 1/2019 | Gausebeck | G06T 17/00 |
| 2019/0266404 | A1* | 8/2019 | Spivack | G06F 16/387 |
| 2020/0073482 | A1* | 3/2020 | Levesque | G06F 3/014 |

OTHER PUBLICATIONS

Extended European Search Report for corresponding EP Application No. 20183687.1, 8 pages, dated Dec. 14, 2020.
Communication Pursuant to Article 94(3)for corresponding EP Application No. 20183687.1, 5 pages, dated May 18, 2022.

* cited by examiner

SURFACE CHARACTERISATION APPARATUS AND SYSTEM

BACKGROUND OF THE INVENTION

Field of the Invention

This disclosure relates to a surface characterisation system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In recent years, driven at least in part by the improvements made in display technology, there has been an increase in the demand for interactive content that is able to offer an immersive experience to a user. For example, the increase in the number and quality of virtual reality (VR) and augmented reality (AR) devices lends itself to the provision of immersive experiences, while the development of televisions and other display devices that offer increased resolution, refresh rate, and colour reproduction (for example) also act as increasingly suitable devices for the provision of such content. In addition to this, advances in computing and graphics technology have contributed to the increase in suitable content that may be made available.

While video games may be provided that can offer such an experience, the approaches taken to provide viewer immersion in video games may not be applicable to captured video content such as movies or sports events. For example, when generating video game content it is common that the locations and properties of all objects in the environment are known and other features, such as lighting information, are also able to be calculated. Such information is often not available for captured video content, and therefore techniques applicable to video games to enable the provision of more immersive content are not considered to be widely applicable.

One example of captured video content that is adapted for increased immersion of a user is that of three-dimensional video. Consumer devices are available that are operable to display content that may be viewed (often aided by a corresponding set of glasses that are configured to enable the viewing of three-dimensional content) in a manner that causes the user to perceive the content as having significant depth despite the use of a two-dimensional display.

However, one drawback with such systems is that the viewpoint that is adopted by the user is often pre-defined (such as tied to the camera position in a movie) or severely limited (such as allowing a user to switch between a number of such pre-defined viewpoints).

This may serve to reduce the level of immersion that is experienced by the user when viewing the content, particularly in a VR context, as despite appearing three-dimensional there is no corresponding motion of the viewpoint as the user moves their head as would be expected were the user to move their head when viewing real-world content. The resulting disconnect between the viewpoint and the user's motion can lead to a sense of discomfort for the user, in addition to the loss of immersion.

Similarly, the restrictions placed upon the viewpoint location may be made more noticeable when a user is provided with more immersive content, as the user may be more inclined to try and explore the displayed environment. This can lead to the user attempting to relocate the viewpoint to a desired location in the virtual environment, and becoming frustrated when such a relocation is not possible within the constraints of the provided content. Examples of such changes in viewpoints include a user moving their head in a VR system in order to look around an environment, or an input using a controller or the like in a two-dimensional display arrangement.

It is in view of the above considerations that so-called free viewpoint systems have been developed. The object of such systems is to provide content which a user is able to navigate freely, such that a viewpoint may be selected freely (or at least substantially so) within a virtual environment and a corresponding view is able to be provided to a user. This can enable a user to navigate between any number of viewpoints within the virtual environment, and/or for multiple users to occupy corresponding preferred viewpoints within the virtual environment. These viewpoints may be distributed about an environment in a discreet fashion, or the changing of viewpoints may be a result of a continuous motion within the environment, or content may incorporate elements of each of these.

A number of challenges exist when seeking to provide high-quality image or video content with a free viewpoint. A number of such problems derive from the limitations of the content capturing systems that are used; for example, it may be difficult to capture sufficient image information due to occlusions, image resolution, and camera calibration or the like. In addition to this, information that may be required to generate additional viewpoints (such as lighting information, depth information, and/or information about occluded objects) may be difficult to derive based upon the captured image information. Similarly, limitations of the image capturing arrangement may lead to noisy data being obtained due to a lack of precision; such data may not be suitable for reproduction.

While a number of the problems associated with these issues can be mitigated by the inclusion of a greater number of cameras (or other sensors), this can be rather impractical in many cases. Similarly, addressing these issues by simply increasing the amount of processing that is applied can also be problematic, particularly when live content is being provided, as it may introduce an undesirable latency or require excessive computing power. It is therefore considered that alternative modifications to the free viewpoint content generating may be advantageous.

SUMMARY OF THE INVENTION

It is in the context of the above problems that the present disclosure arises.

This disclosure is defined by claim 1.

Further respective aspects and features of the disclosure are defined in the appended claims. It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
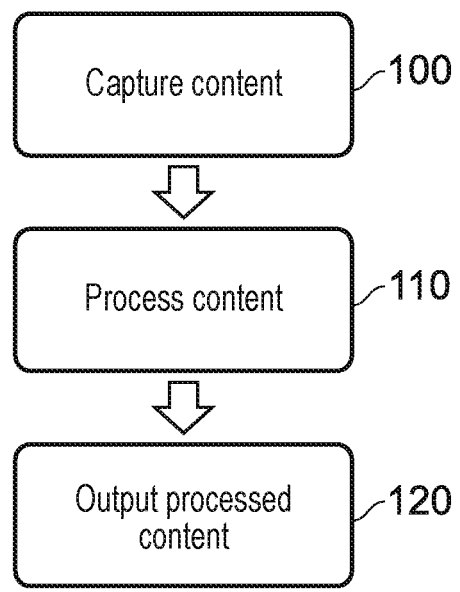
FIG. 1 schematically illustrates a free viewpoint generation and output method.

Referring now to the drawings, wherein like reference numerals designate identical or corresponding parts throughout the several views, embodiments of the present disclosure are discussed.

A number of different approaches for implementing free viewpoint content are considered to be suitable, including photogrammetric, light field/multicopy, and volumetric approaches. Of course, a number of other approaches (or combinations of the above) may be considered.

The first of these approaches comprises the manipulation of captured images in order to appear three-dimensional; this can add freedom to the viewpoint by enabling the user to peer 'around' an object in the image—this can often be rather limited in scope, but is suitable for a number of purposes. Reprojection of the captured image is often used in methods following this approach, enabling the simulation of the 'correct' view (that is, a view that appears to be from the correct position).

The second approach relies on the capturing of a number of images of the environment from different locations. A free viewpoint experience may then be provided to the user by using interpolation between the captured images; the user is able to manipulate the viewpoint freely within the bounds of the image capture area (that is, the area or volume bounded by the image capture devices).

The third approach that is considered, which is the approach in the context of which the present application is provided, comprises the generation of a virtual scene representing the imaged volume in the content capture process. This may include identifying the geometry of the volume and the objects within it, as well as determining any other parameters (such as lighting effects) as appropriate. Such an approach is discussed in 'Multi-View Stereo: A Tutorial' (Y Furukawa, C Hernandez, Foundations and Trends in Computer Graphics and Vision, Vol 9, No. 1-2, 2013), the contents of which are incorporated by reference.

While the present application is framed within the context of the volumetric approach to free viewpoint content, it is considered that the techniques discussed within may be applicable to one or more other approaches.

FIG. 1 schematically illustrates a method for capturing and generating free viewpoint content, in line with the third approach described above.

A step 100 comprises capturing the content. The content capturing process includes the use of image sensors, such as cameras, and may further include the use of microphones or the like for capturing audio. While in some cases the captured image content may be entirely two-dimensional, in other cases the content capturing process includes the capturing of depth information for a scene—this can be achieved using stereoscopic or depth cameras, for example, or any other method for determining the distance to an object in the capture environment. Examples of content capturing arrangements are described below with reference to FIGS. 2 and 3.

A step 110 comprises performing processing on the captured content, with the aim of generating content that a user is able to use to explore the captured environment with the aid of a free viewpoint. Examples of processing include the estimating of the depth of objects within the captured images, and the encoding of the processed data into a suitable format for storage and/or output to a viewer. Each of these is discussed below with reference to FIG. 5.

The processed data comprises a three-dimensional representation of the environment for which the content capture is performed (or is sufficiently complete so as to enable the generation of such a representation). This representation may be able to be distributed to a user to enable them to generate free viewpoint experiences locally, or it may be able to be used (for example, at a server) to generate image frames in accordance with a viewpoint defined by a client device.

A step 120 comprises the output of the free viewpoint content to a viewer. This may be performed in a number of different ways; for example, the viewer may request a particular viewpoint from a server which holds the encoded data. The server may then generate images representing the viewpoint at the requested position, and transmit this to the viewer. In some embodiments, the viewer may instead be provided with encoded data for the whole (or at least a part of) the captured environment such that processing for generating image content is performed locally.

Figure 2:
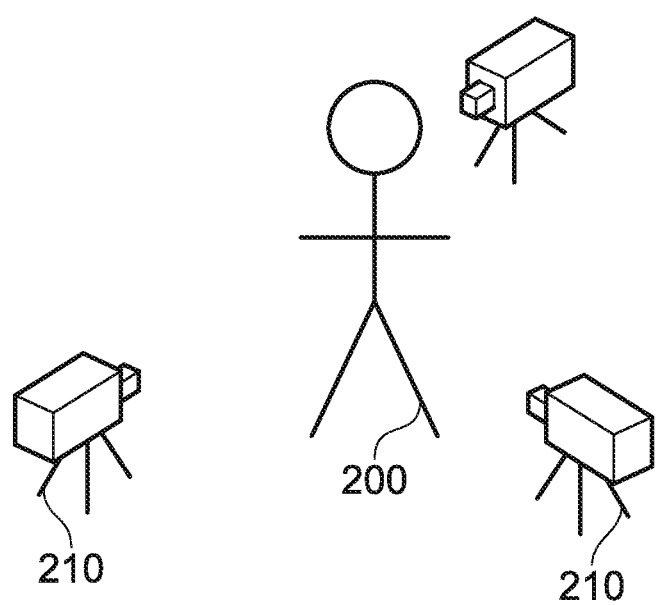
FIG. 2 schematically illustrates a content capture arrangement.

FIG. 2 schematically illustrates a content capture arrangement that may be used to implement step 100 as described with reference to FIG. 1.

In this Figure, a plurality of cameras 210 are arranged so as to capture images of a person 200 (such as an actor in a movie) from a range of different angles. The cameras 210 may also be configured to capture audio in the environment, although this may instead be captured separately. In some embodiments it is advantageous to be able to synchronise the cameras or establish the timing offset between their image capture—this may assist with generating a high-quality output for a user.

Between them, the cameras 210 may be arranged so as to be able to capture images of a significant proportion of the environment and objects within the environment. In an ideal scenario every part of every surface within the environment is imaged by the arrangement of cameras, although in practice this is rarely possible due to factors such as occlusions by other objects in the environment. Such an issue may be addressed in a number of manners, a selection of which is discussed below.

For example, the arrangement of cameras 210 as shown in FIG. 2 may be suitable for capturing images of the user from a number of angles—but the side of the person 200 facing away from the cameras may not be well-imaged, leading to a lack of information for this area. A number of techniques may be used to mitigate this problem, some of which will be discussed below.

Figure 3:
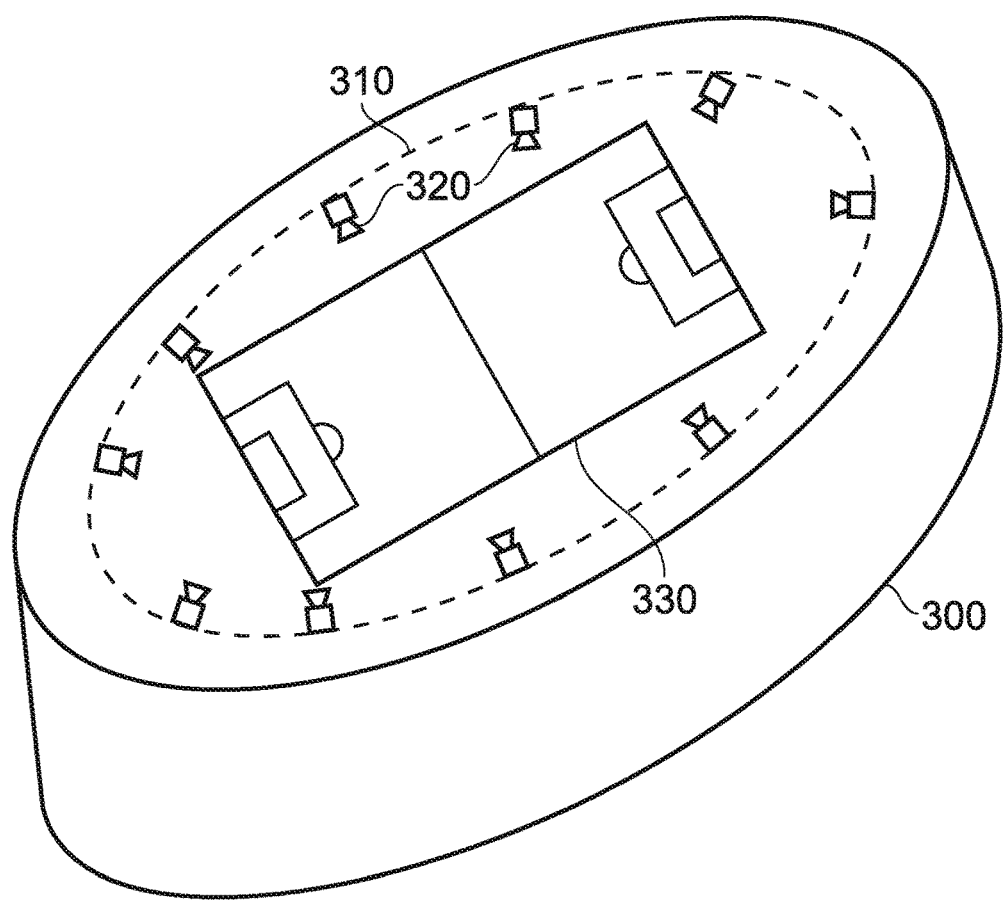
FIG. 3 schematically illustrates an alternative content capture arrangement.

FIG. 3 schematically illustrates an alternative content capture arrangement that may be used to implement step 100 as described with reference to FIG. 1. As is apparent from FIG. 3, this is a configuration that may be more suited for the capturing of large-scale events, such as sports matches, rather than individual people—although of course such an arrangement could be scaled down to an environment smaller than a sports stadium as appropriate.

FIG. 3 comprises a stadium 300 which has a fixture 310 that substantially follows the shape of the stadium 300. A plurality of cameras 320 are supplied on this fixture 310, and may be angled so as to capture images of events within the stadium 300; this may include the action on the pitch 330, the sidelines, or even the crowd. The number of cameras, and the properties of each camera, may be selected freely in order to provide a suitable degree of optical coverage of the environment. For example, a set of 40 cameras each with 4K resolution and arranged so as to be able to collectively image the whole pitch 330 may be provided.

Figure 4A:
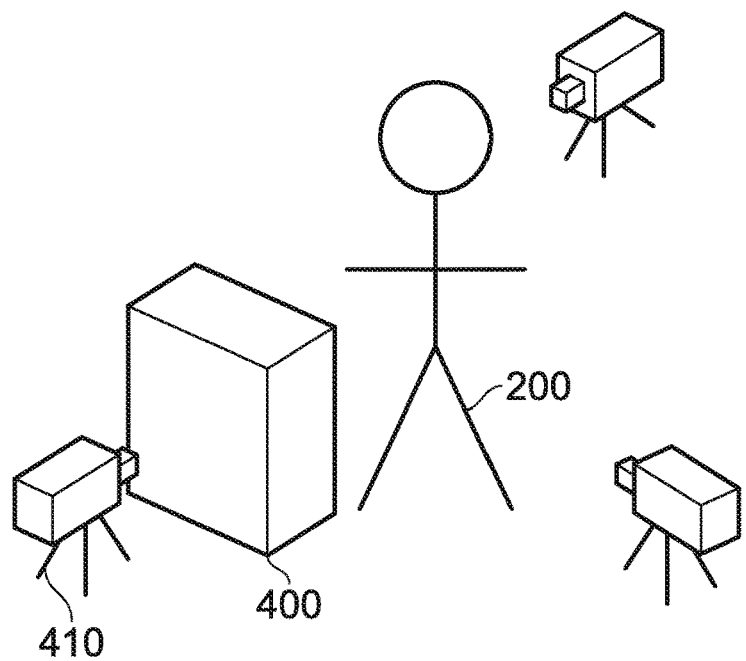
FIGS. 4a and 4b schematically illustrate an occluded content capture arrangement.
Figure 4B:
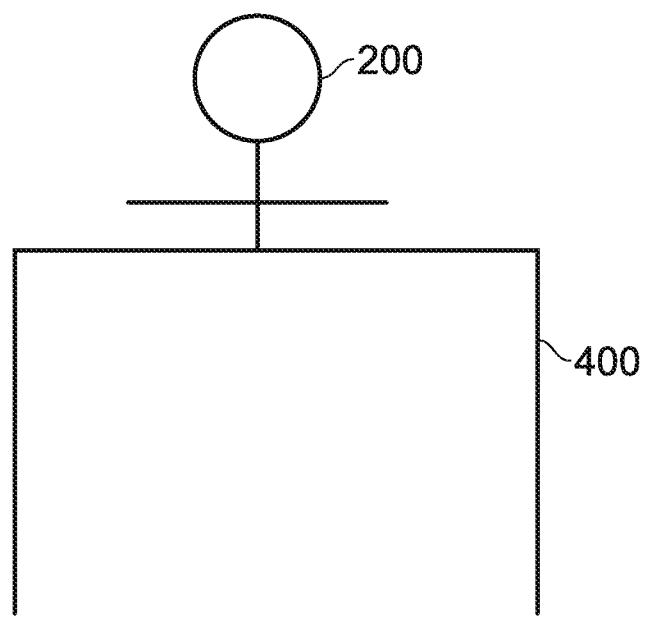

FIGS. 4a and 4b schematically illustrate an occlusion problem that may arise when capturing content in line with step 100 of FIG. 1.

FIG. 4a schematically illustrates an occluded content capture arrangement; this is the content capture arrangement of FIG. 2, with an additional object 400 in the capture environment that prevent the camera 410 from correctly imaging the person 200. Of course, while shown as an inanimate object the object 400 could be anything that blocks the camera's view—such as other people, cameras, or even inclement weather.

FIG. 4b schematically illustrates a viewpoint from the camera 410 of FIG. 4a. It is apparent from this Figure that the camera is no longer able to capture images of the lower half of the person's 200 body due to the occlusion by the object 400. This may lead to incomplete information about this area of the environment, which can cause problems in a free viewpoint arrangement—if a user moves the viewpoint to the other side of the object 400 there would not be sufficient information to generate a view of the person 200.

In some cases, the camera system for capturing images of the environment may be robust to such occlusions—for example, given enough cameras it is possible that the arrangement leads to every part of the environment (or at least a sufficient number of parts of the environment) being imaged by more than one camera. In such a case, it is possible that images of an area occluded from one camera's view are captured by another camera.

Alternatively, or in addition, a number of processing techniques may be used to fill such gaps. For instance, information about that area (such as the colour of the trousers worn by the person 200) may be stored from previously captured frames, or determined in dependence upon other information—for example, it may be assumed that the colour is constant (either over time, spatially, or both), and so any image of the trousers may be enough to supply the colour information despite being captured at a different time, and/or imaging a different portion of the trousers. Similarly, the colour could be input by an operator or the like.

Figure 5:
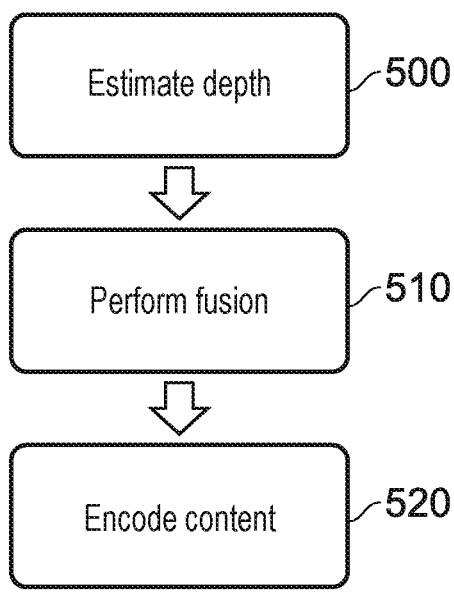
FIG. 5 schematically illustrates a content processing method.

FIG. 5 schematically illustrates a content processing method, which may be implemented as an example of the processing performed in step 110 of FIG. 1. Of course, any suitable processing may be performed in the step 110; it is not limited to that shown in FIG. 5, nor must every step of FIG. 5 be performed.

A step 500 comprises an estimation of the depth of one or more parts of the environment that is imaged. In some cases, this may be performed by identifying the disparity associated with an object between a pair of stereoscopic images; in other cases, monoscopic depth detection may be performed, or a position may be estimated from a number of images based upon knowledge about the position and orientation of the cameras used to capture those images.

A step 510 comprises the fusion of image data. Fusion of image data is the process of combining the information that is obtainable from each of a plurality of images in order to generate a three-dimensional space using images in a two-dimensional space. For example, image data may be fused so as to generate a three-dimensional model of an object that comprises two-dimensional information about each side of the object, as imaged by a corresponding plurality of cameras. This is discussed below in more detail, with reference to FIGS. 6 and 7.

A step 520 comprises the encoding of the processed image data, for example to generate data that is in a format that is suitable for storage and/or transmission to a user. Examples of suitable representations of the content include the use of point clouds and/or meshes to represent objects and features in the environment. For instance, a point cloud may be defined that describes the location of points on the surface of each of a number of objects/environmental features. When rendering an image, a viewpoint within the virtual environment may be defined and the point cloud is consulted to determine which objects (points) fall within the viewing frustum—once this is determined, corresponding texture information may be applied to generate a view within the virtual environment.

Further processing may also be performed in addition to, or instead of, one or more of the steps shown in FIG. 5. For example, segmentation may be performed so as to determine which elements of a captured image correspond to distinct objects and which elements form the background. Hole-filling or completion processing may also be performed, which is processing that seeks to identify where information about the environment is missing and to approximate information that may be desired, but is not present in the captured information.

As discussed with reference to step 510, fusion of image data may be performed in order to generate a more complete description of the environment in which image capture is performed. For example, image data from a second camera may be used to supplement the image data from a first camera, which can mitigate the problem of occlusion.

In general, fusion techniques utilise a number of captured images that each capture an image (a two-dimensional image and depth information) of the environment, the images being captured at different times or from different camera positions. These images are then processed to extract information to enable a three-dimensional reconstruction. An example of such a process is discussed below.

At a first stage, segmentation is performed. This process results in a separation of an imaged object and a background of the image from one another, such that the background may be removed from the image. The segmented image of the object, in conjunction with the depth data that is captured, can then be used to generate a three-dimensional image of the object from one side, where every pixel of the image represents a point in three-dimensional space.

By generating multiple such images from a number of viewpoints, three-dimensional images may be generated for an object from a number of different sides; this can enable the construction of a full three-dimensional volume representing the external shape of the object. The fusion process here is used to correlate matching points as captured by the different cameras, and to remove any erroneous points, so as to enable a combination of the captured three-dimensional images into a three-dimensional representation.

Figure 6:
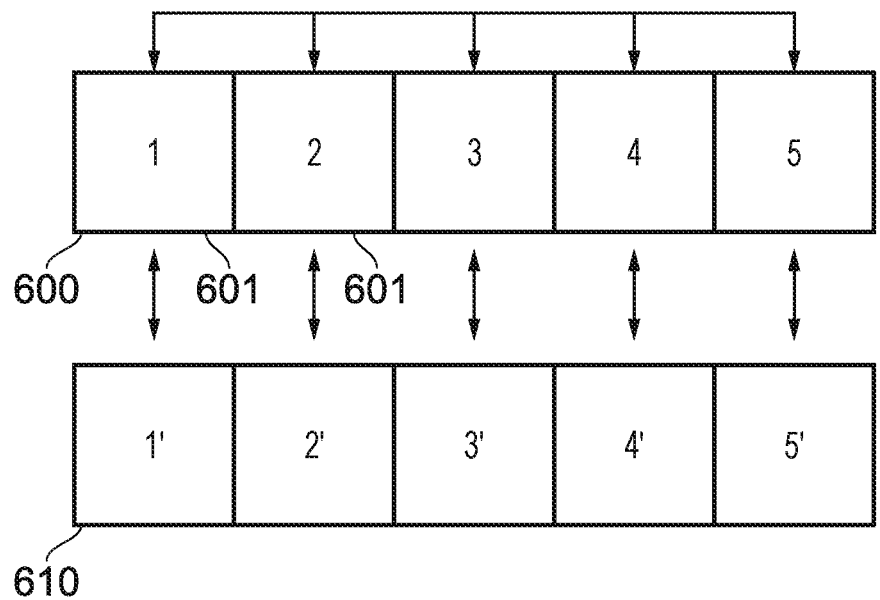
FIG. 6 schematically illustrates image fusion schemes.

FIG. 6 schematically illustrates examples of such fusion. A first image data set 600 and a second image data set 610 are shown, which correspond respectively to image data captured by a first and a second camera. Each of the image data sets comprises a number of consecutive frames 601.

Temporal fusion is a fusion technique that may be performed within a single image data set (that is, an image data set captured by a single camera over a time duration). In FIG. 6, this is shown with respect to the image data set 600, wherein information from the frames 601 (labelled 1-5) may each be used to supplement data from the other frames. Temporal fusion may be advantageous when there is motion of objects within the environment; occlusions may vary between the image frames captured by a single camera, and therefore image data from earlier- or later-captured frames may be suitable to fill gaps (such as those due to occlusion) in the data for a given image frame.

Spatial fusion may be performed between the two image data sets 601 and 610 (that is, image data sets captured by cameras located at different viewpoints); for example, image data from the frame labelled 1' may be used to supplement the image data derived from the frame labelled 1. This may be performed for any pairing of image frames, rather than necessarily being limited to those captured at (at least substantially) the same time. Spatial fusion is advantageous in that the image data from each of the image data sets is obtained from a different position—different views of the same object may therefore be captured.

Figure 7:
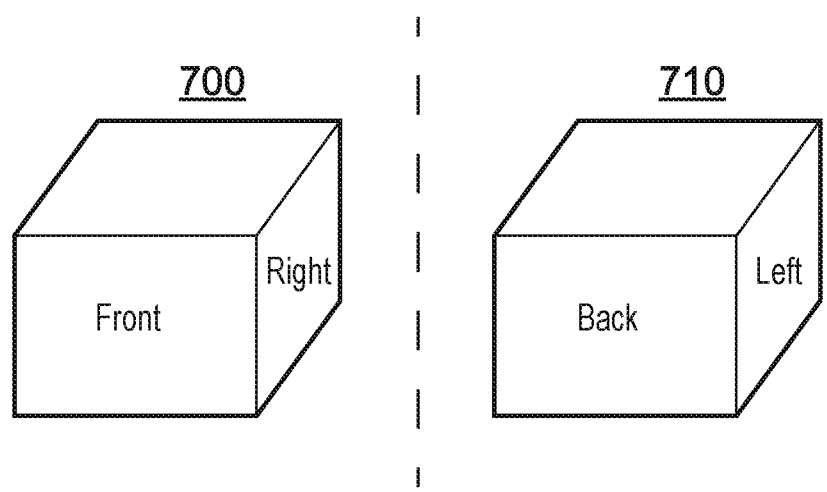
FIG. 7 schematically illustrates image frames for performing image fusion.

FIG. 7 schematically illustrates an example of two image frames 601, each imaging the same object. In the first, labelled 700, the front, top, and right portions of the object can be seen by an image capture device. In the context of FIG. 6, the image 700 may correspond to the image frame labelled 1 in the image data set 600.

In the second, labelled 710, the back, left, and top portions of the object can be seen by an image capture device. In the context of FIG. 6, the image 710 may correspond to the image frame labelled 1' in the image data set 610. This view would therefore represent a view of the object as captured by a different image capture device that is provided at a different location. Alternatively, the image 710 may correspond to the image frame labelled 5 in the image data set 600. This view would therefore represent a view of the object as captured by the same image capture device but at a later time, this time difference being sufficiently long that the object has rotated (or the camera has moved).

In either case, the data from each of the images 700 and 710 may be combined so as to generate a more complete description of the imaged object than would be available using only a single image frame comprising the object. Of course, any suitable combination of spatial and temporal fusion may be used as appropriate—the fusion process should not be limited to the specific examples provided above.

It should be appreciated that the segmentation-based approach used in the example above is non-limiting; other methods may be suitable. For example, a truncated signed distance function (TSDF) may be used to represent a scene volumetrically, with this representation being used for integrating multiple images of the scene captured from different viewpoints.

At the conclusion of the method described with reference to FIG. 5 (or an equivalent processing of the captured data), it is anticipated that the captured content has been converted into a form that enables the generation of a viewpoint at any (or at least at a substantial number of) locations within the captured environment.

Figure 8:
FIG. 8 schematically illustrates a data structure.

FIG. 8 schematically illustrates an exemplary data structure for the storage of the generated content; the stored generated content may be referred to as free viewpoint data. In this data format, a file 800 comprises point cloud information 810, texture information 820, and additional information 830. Of course, an alternative data structure may be provided, as is appropriate for the format of the generated content.

The point cloud information 810 may comprise sufficient data to enable to reproduction of the entire virtual environment, or at least a portion of that environment. For example, a different set of point cloud information 810 may instead be generated for each of a plurality of areas within the virtual environment—such as on a per-room basis.

The texture information 820 complements the point cloud information 810, such that textures are provided that correspond to each of the surfaces that are able to be described using the point cloud information 810. As noted above, the texture information is applied to the geometry described by the point cloud within a viewing region (defined by the viewpoint within the virtual environment) as a part of the rendering process. The textures can be stored in any suitable image format, for example.

The additional information 830 may comprise identifying information for the data structure (such as identifying the virtual environment that is represented by the included data). Alternatively, or in addition, information assisting with the reproduction of a virtual viewpoint within the virtual environment described by the point cloud information 810 may be provided; examples include lighting information for the environment. Any other suitable information may also be included as appropriate, such as object identification information or sound source information for the virtual environment.

As noted above, this information may be provided to the user in a raw form including data (such as a point cloud representation of the environment, in addition to texture and lighting information) for the whole of the environment. However, this represents a significant amount of data to transmit and store (point clouds may comprise millions or even billions of data points) and may therefore be inappropriate in a number of scenarios.

As an alternative, this information may be provided to a viewer by generating an image at a server in response to an input viewpoint position/orientation. While this may introduce an increased degree of input latency, it may be responsive enough to provide a suitable free viewpoint experience to a user.

In either case, rendering of a viewpoint must be performed based upon the encoded data. For example, when using a point cloud representation to store information about the captured environment the rendering process comprises a surface reconstruction process as a part of generating an image for display. This is performed so as to enable to generation of surfaces from a set of discrete points in the point cloud.

Figure 9:
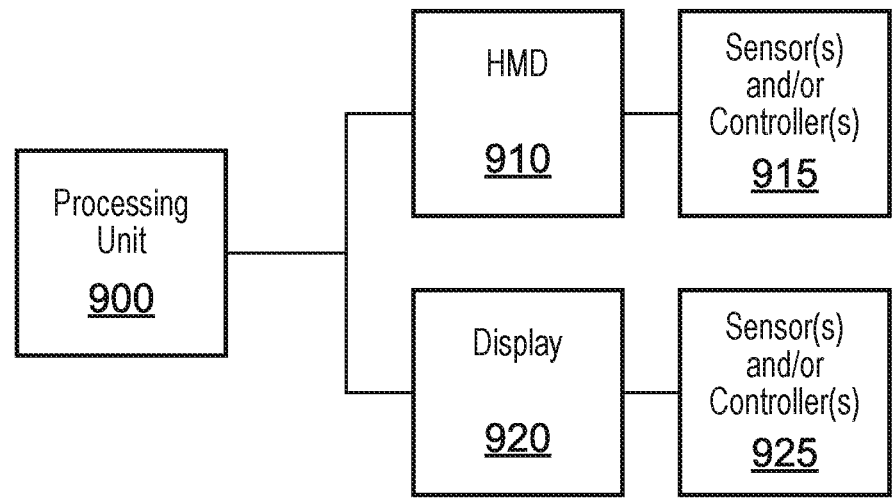
FIG. 9 schematically illustrates a content generation and display system.

FIG. 9 schematically illustrates a content generation and reproduction system. This system includes a processing unit 900, an HMD 910, and a display 920.

Figure 10:
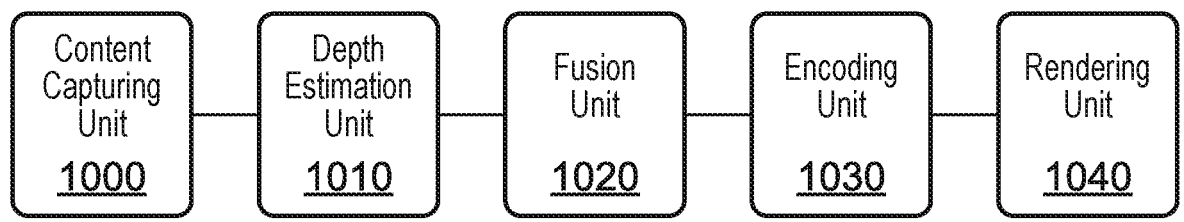
FIG. 10 schematically illustrates a processing unit.

The processing unit 900 is operable to generate content (for example, by using the method discussed with reference to FIG. 1), and to render a desired viewpoint for display to each of one or more users within the generated content. An exemplary arrangement of units within the processing unit 900 is shown in FIG. 10 and discussed below.

The desired viewpoint may be determined in any of a number of ways; for example, the HMD 910 may be associated with one or more position and/or orientation sensors 915 that enable the user's head motion (or any other suitable motion) to be used as an input to control the motion of the desired viewpoint. Alternatively, or in addition, the viewpoint may be controlled via inputs to a controller 915. Similarly, inputs to control the viewpoint may be provided via a control pad (such as a game controller) that is associated with one or more of the displays 910 (via the controller 915) and 920 (via the controller 925) and/or the processing unit 900.

In any case, the viewpoint may be controlled in a three-dimensional manner such that the user can move the viewpoint freely (or at least substantially freely) within the virtual environment, as well as modify the orientation of the viewpoint within the virtual environment defined by the free viewpoint data.

The HMD 910 and display 920 (such as a television, mobile phone or computer monitor) are operable to display content rendered by the processing unit 900. Each of these may be used independently, such that the other device does not display content at all, or in combination; for example, the displays may show the same content (with one of the display devices acting as a spectator screen, for example) or may show different viewpoints within the same virtual environment. Of course, the number of displays (head-mountable or otherwise) may be selected freely, rather than being limited to one of each type of display.

FIG. 10 schematically illustrates the processing unit 900, as described above with reference to FIG. 9. The processing unit 900 comprises a content capturing unit 1000, a depth estimation unit 1010, a fusion unit 1020, an encoding unit 1030, and a rendering unit 1040.

The content capturing unit 1000 is operable to control the content capture process; for example, this may comprise the control of one or more imaging units and/or audio capture units to generate information about a real environment. Such a process is described above with reference to step 100 of FIG. 1.

The depth estimation unit 1010 is operable to perform a process to generate estimates of the depth of one or more parts of the environment of which images are captured. This may comprise the use of any suitable depth estimation technique, and may use information about the locations of the content capturing devices. For example, this may comprise identifying the disparity between stereoscopic image pairs for an imaged feature. A depth estimation process is described above with reference to step 500 of FIG. 5.

The fusion unit 1020 is operable to perform an image fusion process so as to enable the generation of a coherent virtual representation of the real environment. This may include the generation of three-dimensional representations of imaged objects/features within the real environment. A fusion process is described above with reference to step 510 of FIG. 5.

The encoding unit 1030 is operable to generate data that is in a format that is suitable for the generation of images for display to a user, where those images may be generated for any viewpoint within the virtual environment. In some embodiments, the selected encoding method may be selected in dependence upon the desired transmission/storage methods. For example, if the encoded content is to be transmitted (such as to a separate rendering device via a network) the encoding method may be selected so as to either increase compression or reduce individual file size (such that files can be sent on an as-required basis). A content encoding process is described above with reference to step 520 of FIG. 5.

The rendering unit 1040 is operable to render images of the virtual environment for output to one or more displays (such as the HMD 910 and/or display 920 of FIG. 9). For example, the rendering process may comprise receiving a desired viewpoint (which may be determined based upon user inputs), identifying the regions of the point cloud that appear within the frustum defined by the desired viewpoint, and applying the corresponding textures to those point cloud regions.

In some embodiments, the processing unit 900 is instead not operable to generate the content, but is operable only to reproduce the content for display. For example, the content may be generated elsewhere and information (such as in the form of a file as discussed with reference to FIG. 8) may be provided to the processing unit 900 to enable a desired viewpoint to be rendered upon request for output to one or more display devices 910 and 920.

Of course, in some embodiments it is envisaged that the processing unit 900 may simply act as an intermediate device for accessing content from a server and providing it to the one or more displays 910 and 920. For example, rendered content could be provided to the processing device 900 by a server in response to uploaded information about a requested viewpoint; such content may then be transmitted to one or more displays 910 and 920. Similarly, the processing unit 900 may be omitted altogether in embodiments in which the HMD 910 and/or display 920 are able to communicate with the server directly.

Figure 11:
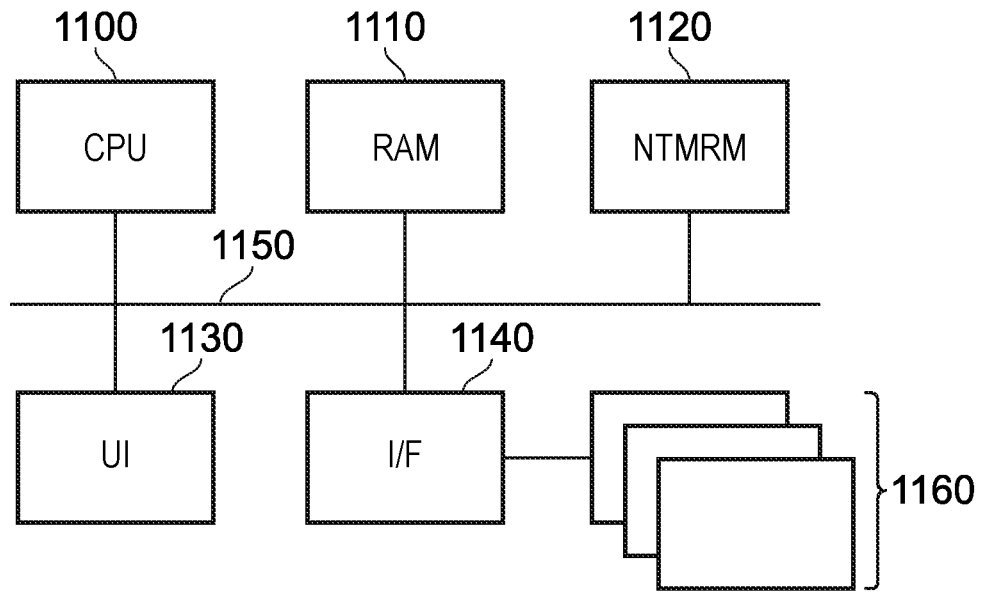
FIG. 11 schematically illustrates a data processing apparatus.

FIG. 11 schematically illustrates a data processing apparatus suitable to carry out the methods discussed above and in particular to implement one or both of the free viewpoint data generation technique(s) and the image viewing or presentation technique(s) outlined above, comprising a central processing unit or CPU 1100, a random access memory (RAM) 1110, a non-transitory machine-readable memory or medium (NTMRM) 1120 such as a flash memory, a hard disc drive or the like, a user interface such as a display, keyboard, mouse, or the like 1130, and an input/output interface 1140 linked to peripherals 1160 such as a camera, a display and a position and/or orientation and/or motion detector by which a current viewpoint (in a display mode) may be controlled. These components are linked together by a bus structure 1150. The CPU 1100 can perform any of the above methods under the control of program instructions stored in the RAM 1110 and/or the NTMRM 1120. The NTMRM 1120 therefore provides an example of a non-transitory machine-readable medium which stores computer software by which the CPU 1100 performs the method or methods discussed above.

As discussed above, one of the problems associated with the generation of free viewpoint content, or indeed any immersive content, is that of capturing information about a real scene. In some cases it may be difficult to obtain enough information about a real environment to be able to generate a realistic reconstruction that is robust to the range of different viewpoints and interactions that are enabled by such content. For example, due to the increased freedom of the user to move around in the virtual environment (which corresponds to the real scene), the objects within the scene may be able to be seen from a range of different angles as well as be interacted with—each of which may not be possible in more traditional viewing arrangements.

It is therefore considered that it may be advantageous to provide information capture and use arrangements that enable a more detailed representation of a real scene to be generated.

Figure 12:
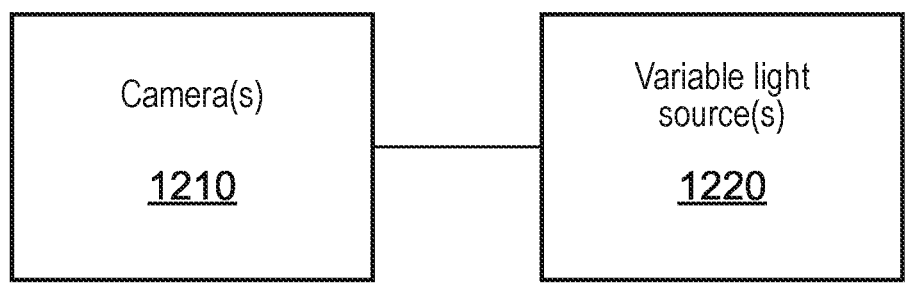
FIG. 12 schematically illustrates an image capture arrangement.

FIG. 12 schematically illustrates an example of such an arrangement. The arrangement of FIG. 12 comprises one or more cameras 1210, in addition to one or more variable light sources 1220.

The one or more cameras 1210 are operable to capture images of the environment; in some embodiments, a plurality of cameras may be provided that are operable to capture images of the same portion of the environment under different conditions. For example, the cameras may be able to obtain images of the environment at different wavelengths of light—such as a visible light image and an infra-red image. In some embodiments, a similar effect may be obtained using a single camera with multiple filters and/or lenses.

In some embodiments, the cameras may be arranged so as to be able to capture images of objects within the scenes from a large range of angles—this may assist in increasing the amount of information that is gathered about each object during the image capturing process.

In some embodiments a plurality of cameras 1210 are provided that are arranged so as to be able to capture images of a significant proportion (or even all) of the environment in which the arrangement 1200 is located.

The one or more light sources 1220 may be operable to illuminate the image capture environment (or at least a portion of the environment) with any of a range of different wavelengths of light (which may be selected during use, for example by providing multiple sources or filters). For example, the light emission may selectively comprise any or each of visible light, infra-red light, one or more particular ranges of visible light (such as blue light, or red light), or any other wavelength or range of wavelengths.

The light sources 1220 may be configured to provide light outputs that vary in any suitable manner, rather than just wavelength; for example, structured light of any suitable format may be provided, and/or more a directional light output rather than a wide-angle light output. In some embodiments, the polarisation of the light may be modified.

Figure 13:
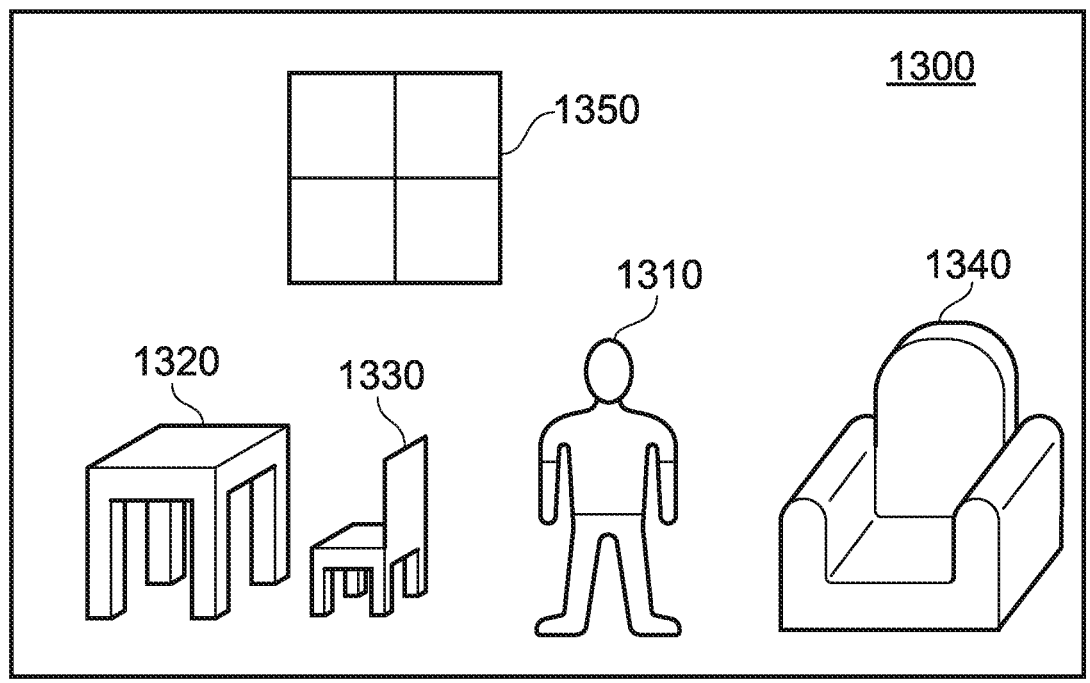
FIG. 13 schematically illustrates a real-world scene.

FIG. 13 schematically illustrates an example of a real scene as imaged by a camera or the like. The scene 1300 comprises a number of objects, each having different properties. The scene 1300 is captured by a camera arrangement (for example, that discussed above with reference to FIG. 12), which may be operable to capture a wider field of view than is shown in FIG. 13 or may be maneuverable to capture further areas of the environment as appropriate.

The scene 1300 comprises a person 1310, a table 1320 and matching chair 1330, a chair 1340, and a window 1350. These objects represent a range of different surface properties that may be encountered when imaging an environment.

For example, a person 1310 may be considered a more complex object to encounter given that that the number of different surfaces is relatively high—the person's skin would be a first surface, with each item of clothing having a further different set of surface properties. The person 1310 may also present a more complex surface to analyse—for example, creases in clothing may present a non-uniform shape to the clothing surface which may need to be considered when determining surface properties. While the person 1310 may have surface properties described on the whole, it may be appropriate to subdivide the person 1310 (that is, to characterise surface portions of the user 1310 separately) such that each of the different surfaces is characterised individually.

The table 1320 and chair 1330 would be expected to be made of the same material, and therefore have the same surface properties. The shared surface properties may mean that it is advantageous to consider these as a single object for the purpose of storing surface property information or the like. In some cases, it may be possible to identify that the objects match and are made of the same material, precluding the need to perform the same amount of processing on each element (for example, analysis could be performed to identify the surface properties of the table 1320, and these properties could be assumed to be the same for the chair 1330).

The chair 1340 is an example of an object that has a more deformable surface (for example, by virtue of having cushions rather than solid wood surfaces), and as a result a more complex modelling of the surface may be required for an accurate reproduction of the chair 1340 in a virtual environment. The deformability of the surface of the chair 1340 may be identified in a number of ways—for example the deformation could be identified from multiple image frames from a video of the environment, object identification (for example, 'chairs' of that style could be identified as being deformable), and/or identification of the material from which the object is made.

The window 1350 may present a unique challenge for surface characterisation amongst the objects shown in the scene 1300; of course, this is because it would be expected to be at least substantially transparent. However, it may be considered important to characterise the surface of the window 1350 in view of potentially changing lighting conditions within the example—for example, the window 1350 may have a glare associated with it at certain angles, and if a light source were provided in the room shown in the scene 1300 it would be expected that the walls surrounding the window 1350 would have a greater increase in brightness than the window 1350 due to less light being reflected.

Due to the difficult nature of determining surface properties of the window 1350, it may be necessary to capture images of the environment (including the window 1350) from a number of different angles. The existence of the window 1350 may also be inferred from the fact that there is a discontinuity (having a regular shape) in the reflective properties of the wall—it may also be the case that an operator is able to specify the existence of the window 1350, and provide information about any properties.

In accordance with the description of FIG. 12, images of the scene 1300 may be captured numerous times (or by numerous cameras) each under different lighting conditions. Processing may then be performed on the images in order to determine material properties of the objects that are imaged. An example of such a process is discussed with reference to FIG. 14 below. Each of the images, due to the different lighting conditions, may be able to be used (either alone, or in combination) to identify one or more properties of the surfaces that are imaged.

For example, a reflectance coefficient may be obtained in dependence upon the ratio of the light that is captured by the camera and the light that is emitted by the light source. In some embodiments, the bidirectional reflectance distribution function (BRDF) may be determined for one or more objects or surfaces within the captured images. The BRDF is a function that defines how light is reflected by a surface—a calculation of the BRDF (possibly in conjunction with one or more other variables) may be sufficient to identify a material from which a surface is formed. Of course, any other suitable optical properties of a surface may be identified—examples include any other reflective properties (such as the spatially varying BRDF, or the location of specular highlights), or textural properties of the surface.

Figure 14:
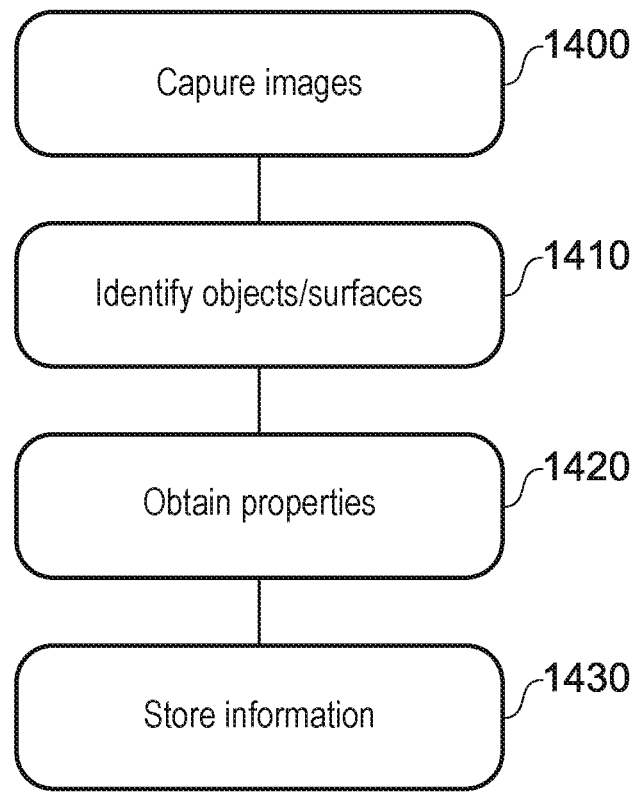
FIG. 14 schematically illustrates a processing method.

FIG. 14 schematically illustrates such a processing method.

A step 1400 comprises capturing one or more images of the environment including one or more objects and object surfaces, for example in accordance with the discussion above.

A step 1410 comprises identifying one or more objects or object surfaces within the captured images. While this may comprise an object recognition process, this is not essential and instead this step may comprise only the identifying of the locations of surfaces and/or objects without determining what it is that the objects/surfaces represent.

Figure 15:
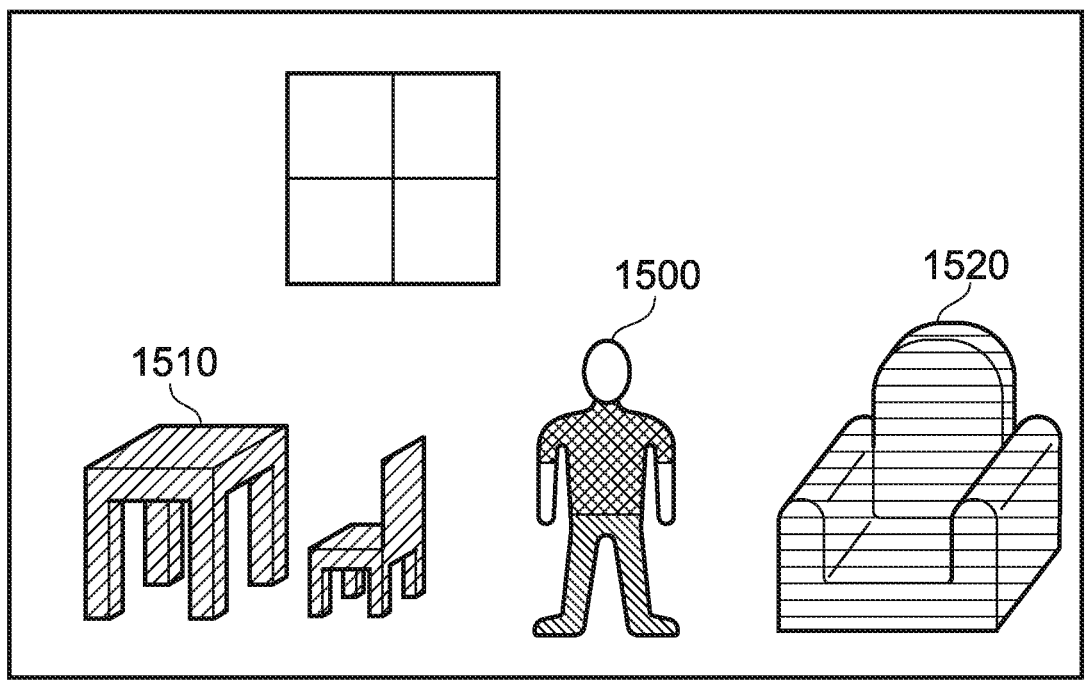
FIG. 15 schematically illustrates a processed image.

For example, segmentation processing may be applied to captured images in order to identify image regions that correspond to different objects; an example of this processing applied to the scene of FIG. 13 is shown in FIG. 15. The segmentation may be performed in dependence upon any suitable image features—examples include applying an edge detection function, the use of depth data, and/or the use of colour information or other surface properties.

FIG. 15 illustrates examples of a number of ways in which segmentation (or simply categorization of objects/surfaces) may be applied. The image of the person 1310 has been segmented into a number of different portions—as shown by the hatching of the person 1500, the tshirt and trousers are segmented as different elements, and the user's skin/shoes (unhatched, and vertically hatched, respectively) are also considered as different elements. This is in recognition of the different surface properties that each object/portion may have.

The table 1320 and chair 1330 have been segmented into a single unit 1510—this is in recognition of the fact that they are formed of the same material, and as such have the same (or at least substantially similar) surface properties. The chair 1340 has been hatched (reference 1520) as a single unit, although of course different portions of the chair could have been segmented into separate portions.

A step 1420 comprises the obtaining of one or more properties of the objects/surfaces. This can be performed in any suitable manner, either direct or indirect, with the purpose of being able to identify sufficient information to enable a realistic reproduction of an object/surface within a virtual environment.

An example of direct methods of determining properties includes the measurement of the reflectance of a surface or the calculation of a BRDF (as discussed above). These are referred to as direct methods in the present disclosure as they relate to quantities that are measured from the captured images, rather than being inferred properties.

An example of indirect methods includes the use of identifying information for an object to retrieve information about the properties of an object/surface from a database or the like. For example, the shape of an object may be determined from a captured image, and this may be sufficient to be able to identify the object and any associated properties.

Of course, other methods are also considered to be useful; for example, one or more measurements may be made using images captured of the environment and this could be mapped to further information. For example, light captured by a camera arrangement could be mapped to a database of known BRDFs in order to determine which most closely matches the captured light.

In some embodiments, this step may be performed before step 1410, and the identification of objects/surfaces may be based upon the obtained properties.

A step 1430 comprises the storing of the obtained information. This information may be stored in any of a number of suitable manners; for example as metadata associated with the image or in a separate database or lookup table comprising information about the objects within a piece of content. Alternatively, or in addition, the imaging may be used as part of an environment mapping process, and it may be possible to associate the object/surface properties with positions in the map.

Of course, rather than being limited to purely optical properties of a surface, the obtained properties may relate to any number of additional properties. For instance, information describing the texture or hardness of a surface may be identified. This may be based upon the optical properties of a surface as captured in the images (such as more reflective surfaces being regarded as being smoother and harder), or by object recognition and association with a database of surface properties. Such properties may be of particular use with regards to haptic feedback to be provided to a user when exploring a virtual environment based upon the captured images.

For example, in the example of FIG. 13, a user may be able to distinguish between virtual representations of the table 1320 and the chair 1340 based upon touch only using haptic information generated (or obtained) in dependence upon optical properties. For example, the table 1320 would likely appear to be more reflective than the chair 1340, and object recognition may be suitable for identifying the objects so as to further be able to characterise the differences between the objects.

When interacting with these virtual representations, it would therefore be expected that the haptic feedback when interacting with the representation of the table 1320 would be more forceful when considering impacts, and a smoother interaction when running a hand over the surface. In contrast, when interacting with the representation of the chair 1340, the user would experience a softer feedback when considering impacts and more friction (for example, represented by a low-intensity vibration) when running a hand over the surface. Of course, the manner in which the haptic feedback is provided may be determined freely—any suitable haptic feedback systems may be appropriate in this context.

In some embodiments, it may be possible to generate a haptic map of the scene. For example, a map of the environment may be generated that comprises information about the location of one or more surfaces and their associated properties (such as hardness and surface texture). This may be stored in conjunction with information about other surface properties, such as reflectance and the like, or separately as appropriate.

As noted above, the obtaining of optical properties of one or more objects in the scene may be advantageous in generating realistic representations of those objects in a virtual environment. The obtaining of optical properties, rather than relying only on images of the objects within an environment, may be useful for at least the following reasons.

As a first example, the number of viewing angles for which the objects within the environment would appear realistic may be improved. For instance, the reflections on a surface may be able to be more accurately generated for a user viewing position relative to the surface, given the surface properties. Similarly, this may increase the resilience of the virtual representation to the motion of light sources within the virtual representation of the environment, as the reflectance properties may be more accurately modelled.

In addition to this, the number of viewing angles may also be increased so as to include angles of the object which have not be captured. It may be possible, based upon the measured properties of a surface, to predict the surface properties of surfaces not visible to the image capture arrangement. In some embodiments, this may be dependent upon an identification of the object (for example, to determine the geometry of the object or to determine the extent to which the surface information is applicable to other surfaces of the object). This may assist with dealing with occlusions in the image capture process, and enable a viewpoint to move even further about an image capture position within the virtual representation of an environment.

Similarly, objects that are imaged may be able to be manipulated in the virtual environment more freely in view of the gathering of this surface information. This may arise from the ability to generate accurate surface lighting as the manipulation causes the relative positions of the viewer, object, and light source to change, in addition to the generation of surface information for occluded portions of an object.

Characterisation of the surfaces may also enable a more accurate virtual representation under different lighting conditions. For example, the optical properties may be dependent upon the wavelength of the incident light. In some embodiments, the light source within the virtual representation may be selected to simulate a particular wavelength, and the properties of the surfaces should be modified accordingly. For instance, some objects may be transparent to particular wavelengths while reflecting other wavelengths.

It should therefore be clear that there are numerous advantages associated with such a surface characterisation. These advantages may be applicable to both augmented reality and virtual reality implementations, as well as free-viewpoint implementations provided via any suitable display device.

Such an arrangement may be improved further by providing an appropriate training or tuning of the system; this may be performed in any number of ways.

In some embodiments, one or more databases may be provided that can be used to identify one or more objects and/or one or more surface characteristics. In the former example, the identified shape of an object may be compared to a database of objects to determine a matching object, so as to be able to identify the object. In the latter case, any suitable parameters may be used to obtain the surface characteristics—for example, an object ID or other identifying information for the object may be used, or information about the surfaces (such as one or more measured or determined quantities such as a BRDF or a material).

While it may be appropriate to provide a single database comprising a large number of objects, to increase the chances of being able to identify a given object, in some embodiments it may be preferred to use a number of smaller databases that are more specific. For example, an 'indoor' and an 'outdoor' database could be provided, or databases for different collections of content ('furniture', 'animals', and 'games consoles', for example). Personalized databases may also be provided, for example a database generated for a user in response to inputs indicating expected objects to be imaged.

In some embodiments, models may be provided that are operable to predict the surface properties and/or object geometry of parts of objects that are not able to be fully imaged by the camera arrangement. Such a model uses information that has been obtained about an object as the input (such as properties or the shape of visible surfaces) and is operable to output information about non-imaged surfaces. For instance, when viewing the table 1320 of FIG. 13, a model may be operable to predict that the surface has the same properties at all points, and that the table is roughly the same on each side—and so the far side may be assumed to be the same as the near side.

In some cases, a machine learning model may be trained to identify surface characteristics from the captured images. For example, by training a machine learning model on tagged data indicating the BRDFs for objects in an image, it may be possible to implement a model that is able to identify the BRDFs for new objects in images that are input to the model. Such information may be useful in determining the materials from which objects in the image are formed, in addition to this.

Figure 16:
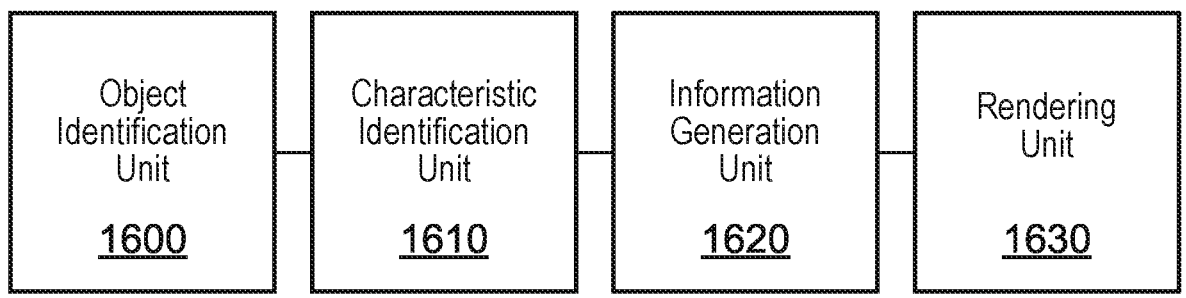
FIG. 16 schematically illustrates a system for characterising surfaces and generating image content.

FIG. 16 schematically illustrates a system for characterising surfaces in a real-world scene, and for generating image content relating to that scene or objects within the scene. The system comprises an object identification unit 1600, a characteristic identification unit 1610, an information generation unit 1620, and a rendering unit 1630.

The object identification unit 1600 is operable to identify one or more objects within one or more captured images of the real-world scene. In some embodiments, the captured images comprise multiple views of at least a subset of the objects under different lighting conditions—for example, at least partially overlapping infra-red and visible light images of the environment.

The characteristic identification unit 1610 is operable to identify one or more characteristics of one or more surfaces of the identified objects. In some embodiments, the object identification unit 1600 is operable to identify one or more objects in dependence upon the characteristics identified by the characteristic identification unit 1610, while in others the identification may be performed in dependence upon the shape of an object, for example, or any other identifying features.

In some embodiments, the object identification unit 1600 is operable to perform a segmentation process on the captured image; for example, a process as discussed above with reference to FIG. 15. This process may be used to identify one or more objects and/or one or more surfaces within the captured image.

In some embodiments, it is considered that the surface characteristics comprise one or more optical properties of the surface; for example, the surface characteristics may comprise a bidirectional reflectance distribution function (BRDF) for a surface. Alternatively, or in addition, the surface characteristics are indicative of one or more qualities of haptic feedback to be provided to a user that interacts with the surface; for example, the surface characteristics may comprise information relating to the texture and/or hardness of the surface.

The information generation unit 1620 is operable to generate information linking an object and one or more surface characteristics associated with that object. This may take the form of any suitable metadata or other data format, so long as the information may be retrieved and/or utilised. For example, a look-up table comprising entries identifying an object and the associated properties may be suitable, or a map of the environment that stores the information as location-based tags or the like.

The rendering unit 1630 is operable to generate images representing the one or more objects in the captured image in dependence upon the generated information. In some embodiments, the generated image represents a viewpoint that is different from that of the captured image—for example, in a free viewpoint or other immersive viewing experience. The rendered images may not be recreations of the imaged environment—for example, in some embodiments only a selection of objects from the imaged environment may be rendered for display.

In some embodiments, the rendering unit 1630 is operable to generate content for virtual reality and/or augmented reality viewing, and one or more users may be able to interact with the representations of the objects. Such interactions may include direct virtual interactions (such as picking up the representation in a virtual environment), or simply viewing the representations from a range of different angles, for example.

Figure 17:
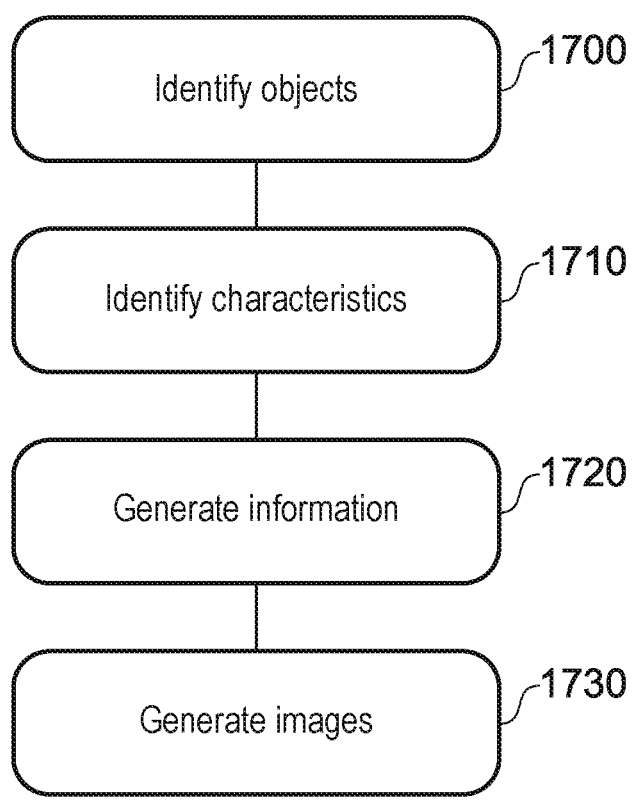
FIG. 17 schematically illustrates a method for characterising surfaces and generating image content.

The arrangement of FIG. 17 is an example of a processor (for example, embodied by the CPU 1100 of FIG. 11 and/or other processing units) that is operable to characterise surfaces in a real-world scene, and in particular the processor is operable to:

identify one or more objects within one or more captured images of the real-world scene;

identify one or more characteristics of one or more surfaces of the identified objects; and generate information linking an object and one or more surface characteristics associated with that object.

FIG. 17 schematically illustrates a method for characterising surfaces in a real-world scene, and for generating image content relating to that scene or objects within the scene.

A step 1700 comprises identifying one or more objects within one or more captured images of the real-world scene.

A step 1710 comprises identifying one or more characteristics of one or more surfaces of the identified objects.

A step 1720 comprises generating information linking an object and one or more surface characteristics associated with that object A step 1730 comprises generating images representing the one or more objects in the captured image in dependence upon the generated information. Of course, this step may be omitted from the process—the information may instead be stored or output for later use, for example.

It will be appreciated that embodiments of the present invention may be implemented in hardware, programmable hardware, software-controlled data processing arrangements or combinations of these. It will also be appreciated that computer software or firmware used in such embodiments, and providing media for providing such software or firmware (such as storage media, for example a machine-readable non-transitory storage medium such as a magnetic or optical disc or a flash memory) are considered to represent embodiments of the present invention.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A system, comprising:
   an object identification unit operable to identify one or more real-world objects within one or more captured images of a real-world space;
   a characteristic identification unit operable to identify one or more characteristics of one or more real-world surfaces of the one or more real-world objects identified;
   an information generation unit operable to generate information linking the one or more real-world objects and the one or more characteristics of the one or more real-world surfaces associated therewith; and
   a rendering unit operable to generate images representing the one or more real-world objects in the captured image in dependence upon the generated information, in such a way that a user is able to interact with the representations of the one or more real-world objects in the generated image,
   wherein the characteristics of the one or more real-world surfaces are indicative of one or more qualities of haptic feedback to be provided to the user, where such haptic feedback is produced as a consequence of the user interacting with the one or more real-world surfaces within the real-world space.

2. The system of claim 1, wherein the object identification unit is operable to identify the one or more real-world objects in dependence upon the one or more characteristics identified by the characteristic identification unit.

3. The system of claim 2, wherein the object identification unit is operable to perform a segmentation process on the captured image.

4. The system of claim 3, wherein the object identification unit is operable to use the segmentation process to identify the one or more real-world objects and/or the one or more real-world surfaces within the captured image.

5. The system of claim 1, wherein the one or more characteristics comprise one or more optical properties of the one or more real-world surfaces.

6. The system of claim 5, wherein the one or more characteristics comprise a bidirectional reflectance distribution function.

7. The system of claim 1, wherein the one or more characteristics comprise information relating to the texture and/or hardness of the one or more real-world surfaces.

8. The system of claim 1, wherein the captured images comprise multiple views of at least a subset of the one or more real-world objects under different lighting conditions.

9. The system of claim 1, wherein the generated image represents a viewpoint that is different from that of the captured image.

10. The system of claim 1, wherein the rendering unit is operable to generate content for virtual reality and/or augmented reality viewing.

11. A method, comprising:
    identifying one or more real-world objects within one or more captured images of a real-world space;

identifying one or more characteristics of one or more real-world surfaces of the one or more real-world objects identified;

generating information linking the one or more real-world objects and the one or more characteristics of the one or more real-world surfaces associated therewith; and generating images representing the one or more real-world objects in the captured image in dependence upon the generated information, in such a way that a user is able to interact with the representations of the one or more real-world objects in the generated image, wherein the characteristics of the one or more real-world surfaces are indicative of one or more qualities of haptic feedback to be provided to the user, where such haptic feedback is produced as a consequence of the user interacting with the one or more real-world surfaces within the real-world space.

12. A non-transitory machine-readable storage medium which stores computer software which, when executed by a computer, causes the computer to perform a method, comprising:

identifying one or more real-world objects within one or more captured images of a real-world space;

identifying one or more characteristics of one or more real-world surfaces of the one or more real-world objects identified;

generating information linking the one or more real-world objects and the one or more characteristics of the one or more real-world surfaces associated therewith; and generating images representing the one or more real-world objects in the captured image in dependence upon the generated information, in such a way that a user is able to interact with the representations of the one or more real-world objects in the generated image, wherein the characteristics of the one or more real-world surfaces are indicative of one or more qualities of haptic feedback to be provided to the user, where such haptic feedback is produced as a consequence of the user interacting with the one or more real-world surfaces within the real-world space.

\* \* \* \* \*